form of what is commonly known as a primary-secondary

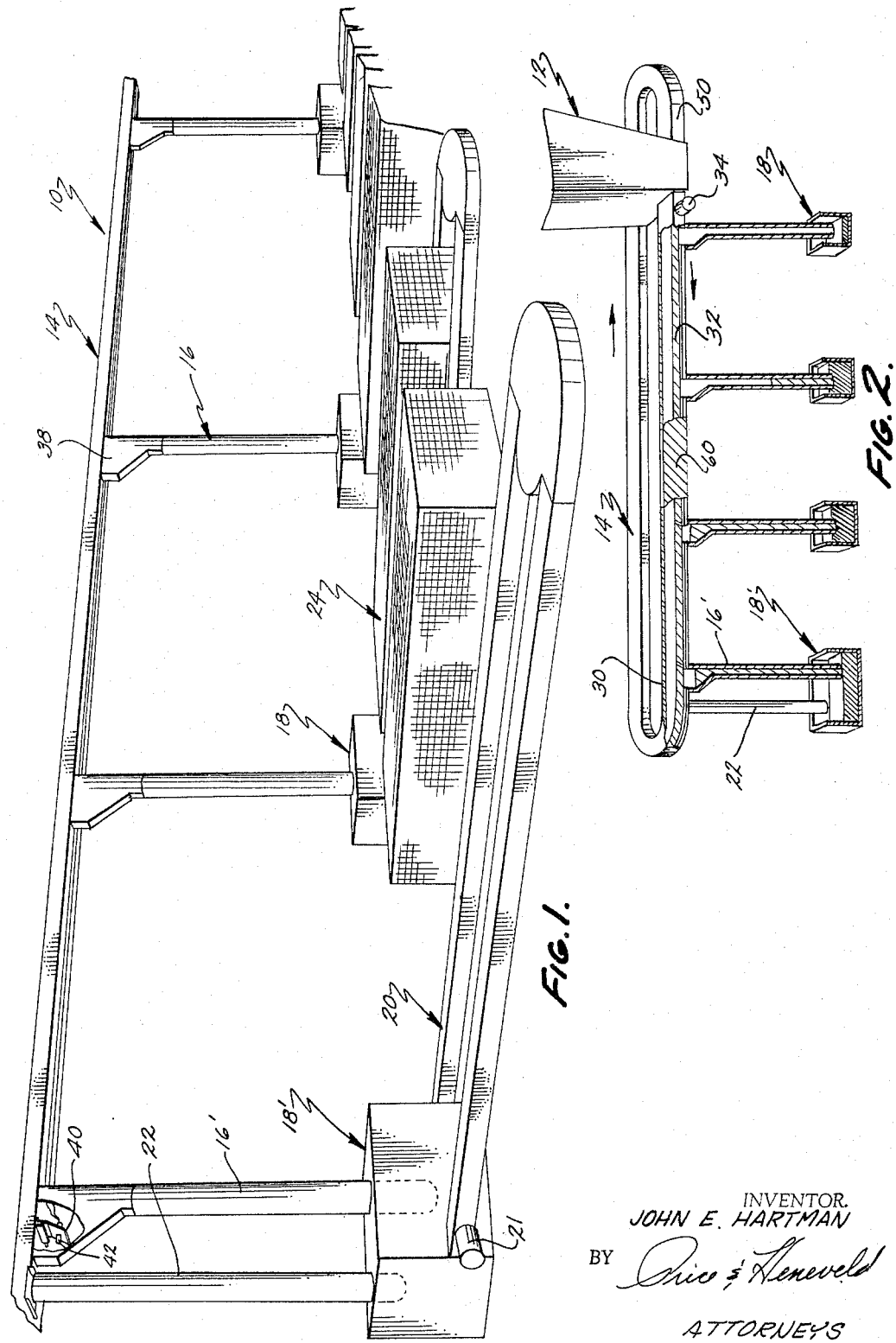

United States Patent Office 3,276,567
Patented Oct. 4, 1966

3,276,567
FEED TRANSFER APPARATUS
John E. Hartman, Holland, Mich., assignor to Big Dutchman, Inc., a corporation of Michigan
Filed May 11, 1964, Ser. No. 366,445
3 Claims. (Cl. 198—66)

This invention relates to animal feeding equipment, and more particularly relates to feed conveying apparatus of the primary-secondary hopper and conveyor type.

Automatic animal feeding equipment, especially when employed in large animal houses, preferably takes the form of what is commonly known as a primary-secondary system. That is, a large main supply hopper provides feed to a recirculatory primary distributing conveyor, which in turn feeds a plurality of gravity downspouts to a plurality of respective smaller secondary hoppers. Each of the secondary hoppers supplies feed to its own recirculatory conveyor which carries feed to respective groups of animals.

The assignee herein, a commercial manufacturer and supplier of animal feeding equipment, incorporates automatic feed responsive switch means at each of the downspouts so that, if any one of the secondary hoppers and its downspouts becomes emptied because of use of the feed by animals feeding from that particular secondary conveyor trough, the switch controller automatically starts the primary conveyor to fill the empty hopper and downspout again.

With this equipment, the assignee herein has experienced a difficulty due to the tendency of the primary conveyor trough to burst and spill feed at the junction of its return leg to the primary hopper.

It was found by the inventor herein that bursting of the conveyor trough and spilling of the feed is due to the force applied by the moving conveyor element, usually a chain, to push feed back into the bottom of the primary hopper against the force of feed in the hopper. Since the feed in the hopper offers such great resistance to movement, and since the conveyor element continually moves, something has to give. The trough does.

Upon further investigation, it was found by the inventor that feed was returned to the conveyor hopper under particular circumstances when the primary conveyor is operated to fill one of the downspouts and its secondary hopper. Assuming that one of the several downspouts is emptied, and the primary conveyor operates to fill it, if the downspouts downstream of the primary conveyor are still full, the feed remaining in the primary conveyor trough downstream of the empty downspout will be recirculated back to the primary hopper. This is the feed that causes the difficulty.

After realizing the full import of the problem and the causative factors therefore, the inventor herein devised a solution to the problem.

It is the an object of this invention to provide a conveyor system that eliminates the feed spillage problem between the return leg of the recirculatory conveyor and the hopper.

It is another object of this invention to provide a relatively simple, but extremely significant and effective component in the primary conveyor of a primary-secondary animal feeding system that completely eliminates the conveyor trough bursting and feed spillage at the primary hopper.

Another object of this invention is to provide a primary-secondary animal feeding system which allows automatic actuation and deactuation of a primary conveyor to maintain the secondary hoppers and feed systems full at all times, but which eliminates the difficulties caused by recirculated feed.

These and several objects of this invention will become apparent upon studying the following specification in conjunction with the drawings in which:

FIG. 1 is a perspective fragmentary view of the primary-secondary system of this invention; and FIG. 2 is a perspective, partially cut-away view of the main portions of the system of this invention.

The complete primary-secondary system 10 includes a primary hopper 12, a primary recirculatory conveyor means 14 operably associated with hopper 12, a plurality of spaced gravity downspouts 16, a plurality of respective secondary hoppers 18 for the downspouts, a plurality of secondary conveyors 20 associated with the respective secondary hoppers, and a feed relief outlet 22 in the form of a downspout which is operably associated with the secondary hopper that is the furthest downstream on the primary conveyor from the primary hopper.

In the form of the invention illustrated, the system is capable of supplying feed to poultry in a plurality of parallel rows of poultry cages 24. The secondary conveyors circulate around the poultry cages. The primary secondary system can be used for feeding any type of animals in any particular type of arrangement in the building.

The primary hopper 12 is ordinarily tremendously large, and usually located outside the building. It normally has a convergent bottom for easy outflow.

The primary conveying means 14 includes a conveyor trough 30 and a recirculating, articulated conveying element 32 such as a chain of the type shown in United States Patent No. 2,737,823. The chain is moved by a drive motor means 34 operably connected with the chain.

Each downspout 16 includes an enlarged housing 38 on the upper end. It incorporates a feed level sensor 40. The sensor pivotally shifts up when the downspout is filled, and down when the spout is emptied. The sensor includes a mercury switch 42 which makes or breaks the circuit to the drive means 34 of the primary conveyor when shifted. Each switch in each downspout is in electrical series with motor 34 and a power supply so that, if any one of the downspouts and its corresponding secondary hopper becomes empty, the sensor will shift the mercury switch to actuate it, causing the circuit to be completed for actuation of motor 34. The primary conveyor element operates until the empty downspout again is filled to the level sufficient to shift the pivotal sensor and open the switch. This control means maintains all secondary hoppers full at all times when the system is active. If it is desired to have the system operative only at certain times of the day, a master control (not shown) may be provided to break all the circuits until the desired time interval.

Each of the downspouts corresponds with its own respective secondary hoppers. Thus, the spaced downspouts supply the secondary hoppers which are spaced to correspond to the rows of poultry cages or other animal feeding arrangements. The secondary hoppers are normally open top bins, with the downspouts extending thereinto. The lower end of each downspout determines the level to which the secondary hopper is filled. Once the feed reaches this point no more feed can flow out of the downspout. In many instances, when the animals are fed at particular time intervals of the day, the secondary hoppers and downspouts are filled to the top of the downspout only at selected times by operating the primary conveyor while the secondary conveyors are still shut off. Then, when the time interval for the animals to feed occurs, the motor drive means 21 for each of the secondary conveyors is actuated to recirculate the feed while the animals eat, and while the primary conveyors are inactive. The amount of feed supplied for that feeding period is thus controlled by the amount previously supplied to the secondary hopper and the downspout. It will be understood that various sequential timing arrangements can be achieved.

With this type of system, it has been commonly experienced that the juncture 50 of the return leg of the primary conveyor 14 with the base of the primary hopper 12 is the location of considerable feed spillage with the conveyor trough being ruptured. This was found to be due to feed recirculated back to the hopper and not discharged to the downspouts. The pressure of the moving conveyor chain on the return feed tries to force it into the bottom of hopper 12 against the force of the weight of the feed in the hopper. This will be understood by referring to the diagram in FIG. 2. Assume that all the downspouts and secondary conveyors and hoppers are filled to the top of the downspouts and then the primary motor 34 for the primary conveyor was shut down with some feed 60 still in the trough. When animal feeding time occurs, the secondary conveyors transfer the feed from the secondary hoppers to the animals. Assume that the animals feeding from the very first secondary hopper consumed almost all of the feed so that the downspout and secondary hopper were practically empty (as illustrated by the unit on the far right in FIG. 2). The second hopper may be only partially empty, while the third and fourth downspouts and hoppers downstream may be almost full yet. Then, when the active time occurs for the primary conveyor to be capable of being actuated, since the first downspout is empty, its sensing switch would cause motor 34 to be actuated to drive conveyor chain 32 and thus transfer feed from hopper 12 to the downspout to fill it. However, a "slug" 60 of feed is still in the main conveyor trough between the second and third downspouts, for example, left there after the last fill operation. Since the downspouts downstream of this plug are still full, it will be recirculated back to hopper 12 to create difficulty at junction 50.

The structure in FIGS. 1 and 2, however, neatly eliminates this difficulty. A special relief downspout 22 is provided which communicates at its upper end with the conveyor trough of the primary conveyor means. It is downstream of the most downstream supply downspout 16'. The lower end of relief downspout 22 is above the feed level in the most downstream secondary hopper 18'. Preferably, this last secondary hopper is considerably enlarged to contain a substantial amount of more feed if necessary. The lower end of relief downspout 22 may be just inside the hopper, or positioned above the hopper's upper edge. At any rate, it is considerably above the lower end of the last downspout 16' so that the level of the feed in the last secondary hopper downstream is always considerably below the lower end of the relief downspout 30.

In operation, even if a slug of feed 60 remains in the primary conveyor trough downstream of the last empty spout, and is conveyed past the most downstream supply downspout 16', it is not returned to the hopper. Rather, it flows out relief spout 22 into the most downstream secondary hopper 18'. Therefore, the return leg of the primary conveyor is always empty of feed.

It is conceivable that the preferred details of the structure as described could be modified somewhat without departing from the concept set forth herein. Consequently, this invention is to be limited only by the scope of the appended claims and the reasonable equivalent structures to those defined therein, rather than to the specific form of the invention disclosed.

I claim:

1. An animal feeding system comprising: a primary feed hopper; a primary recirculatory conveyor operably associated with said primary hopper, having a supply leg from the base of said hopper and a return leg back to the base of said hopper; a moving recirculatory conveying device in said primary conveyor; a plurality of gravity fed supply downspouts from said primary conveyor, spaced therealong; a plurality of secondary hoppers beneath respective ones of said downspouts to be filled therefrom; a plurality of secondary conveyors operably associated with said secondary hoppers; a relief downspout communicating with the interior of said primary conveyor downstream of the most downstream supply downspout on said supply leg, to receive all feed conveyed past said supply downspouts; said relief downspout extending into the secondary hopper beneath said most downstream supply downspout, and having its lower end terminating a substantial amount above the lower end of said most downstream downspout.

2. An animal feeding system comprising: a primary feed hopper; a primary recirculatory conveyor operably associated with said primary hopper, having a supply leg from said hopper and a return leg back to said hopper; a moving recirculatory conveying device in said primary conveyor; driving means for said device; a plurality of gravity fed supply downspouts from said primary conveyor, spaced therealong; feed responsive switch control means in each of said supply downspouts, each operably associated with said driving means to cause operation of said device in the absence of feed in any one of said downspouts; a plurality of secondary hoppers beneath respective ones of said downspouts to be filled therefrom; a plurality of secondary conveyors operably associated with said secondary hoppers; a relief downspout communicating with the interior of said primary conveyor downstream of the most downstream supply downspout on said supply leg, to receive all feed conveyed past said supply downspouts; said relief downspout extending into the secondary hopper beneath said most downstream supply downspout, and having its lower end terminating a substantial amount above the lower end of said most downstream downspout.

3. An animal feed supply system comprising: a supply hopper; a recirculatory conveyor passing through said hopper, extending therefrom and returning thereto, including a conduit and recirculatory moving means in said conduit; a plurality of spaced, fillable, feed discharge downspouts from said conduit; a plurality of feed receiving containers beneath respective ones of said downspouts to be filled therefrom; feed responsive conveyor control means on each of said discharge downspouts operably associated with said moving means to maintain feed in each of said discharge downspouts and their respective containers; and a feed relief downspout on said trough downstream of the most downstream discharge downspout; said relief outlet having its lower end aligned with the container beneath said most downstream discharge downspout, and with said lower end terminating a substantial amount above the lower end of the most downstream downspout, to receive all feed passing said most downstream discharge downspout.

References Cited by the Examiner

UNITED STATES PATENTS

| | | | |
|---|---|---|---|
| 2,311,747 | 2/1943 | Gooch | 198—66 |
| 2,627,336 | 2/1953 | Cordis | 198—169 X |
| 2,674,381 | 4/1954 | Cady | 214—17 |
| 2,738,765 | 3/1956 | Hart | 198—168 X |
| 2,914,023 | 11/1959 | St. Pierre | 119—52 |

EVON C. BLUNK, *Primary Examiner.*

R. J. HICKEY, *Assistant Examiner.*